Jan. 19, 1943.          G. H. KOCH          2,308,610
BEARING LUBRICATION
Filed July 30, 1940

WITNESSES:

INVENTOR
GUSTAV H. KOCH
BY
ATTORNEY

Patented Jan. 19, 1943

2,308,610

UNITED STATES PATENT OFFICE 2,308,610

BEARING LUBRICATION

Gustav H. Koch, Springfield, Mass., assignor to Westinghouse Electric & Manufacturing Company, East Pittsburgh, Pa., a corporation of Pennsylvania Application July 30, 1940, Serial No. 348,339

3 Claims. (Cl. 308—132)

My invention relates to bearing lubrication, and it has for an object to provide improved means for lubricating a bearing of the type which is used, for example, is an electric fan.

A further object is to provide a lubricating arrangement which assures that the oil wick will be brought into contact with the part to be lubricated, thereby avoiding danger of failure of lubrication due to the wick being improperly positioned.

A further object is to provide a lubricating arrangement wherein lubricant dripping from the bearing is returned and its leakage to the exterior is avoided.

A further object is to avoid "oil throwing," that is, creepage of lubricant along the shaft from the bearing to the exterior of the motor casing and throwing thereof by the fan blades.

These and other objects are effected by my invention as will be apparent from the following description and claims, taken in connection with the accompanying drawing, forming a part of this application, in which:

Figure 1:
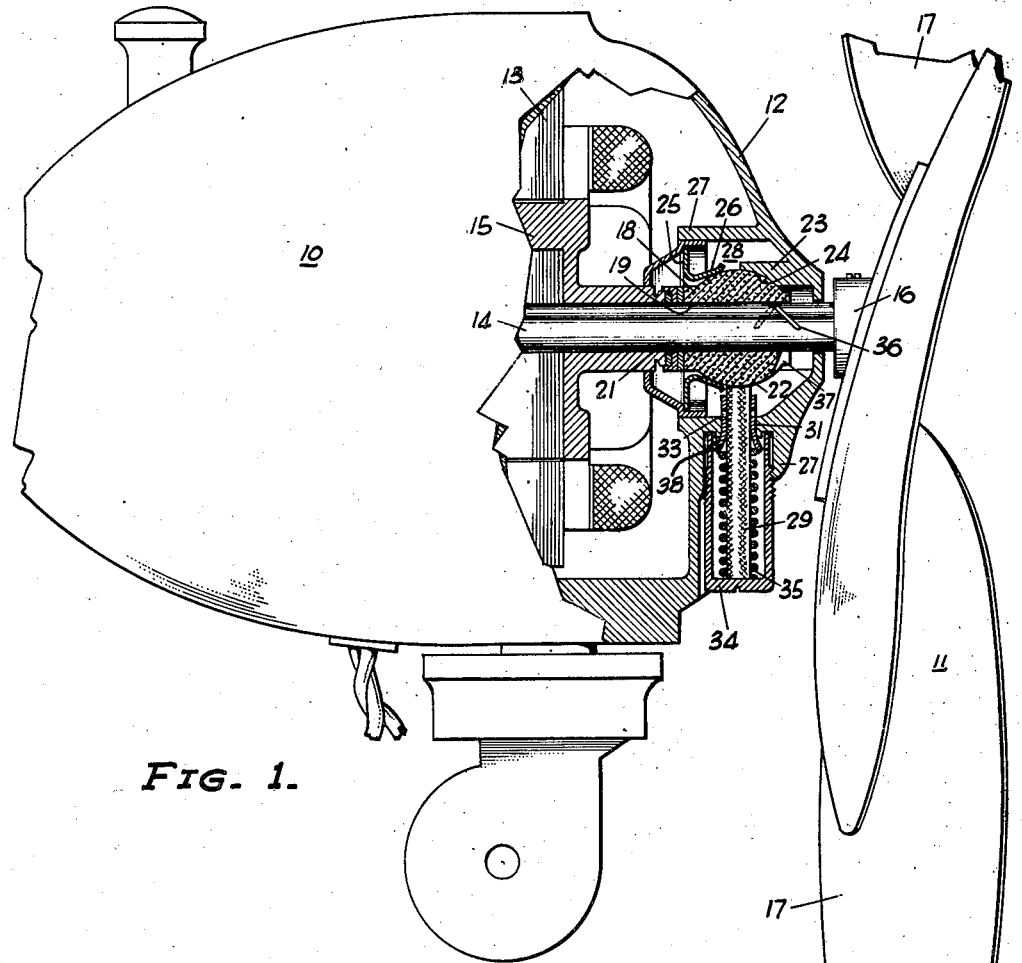
Fig. 1 is a side elevation, with parts in section, of an electric fan embodying my invention.
Figures 2, 3:
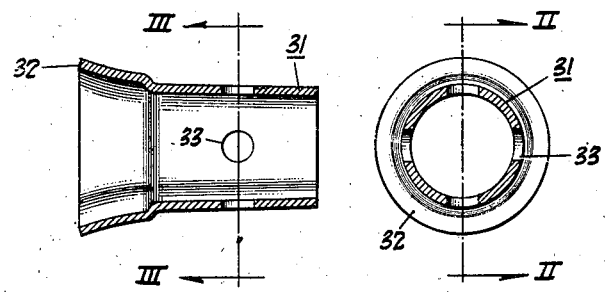
Fig. 2 is a sectional view, taken on the line II—II of Fig. 3 of the tubular wick guide member; and, Fig. 3 is a sectional view, taken on the line III—III of Fig. 2, also showing the tubular wick guide member.

Referring to the drawing in detail, I show an electric fan comprising an electric motor 10 and a propeller fan 11 driven thereby. The motor includes a housing or casing 12, a stator 13 mounted in the housing, a shaft 14 and a rotor 15 mounted on the shaft. The fan 11 is overhung on the end of the shaft 14 which projects from the casing 10. The fan comprises a hub 16 and a plurality of blades 17.

The shaft 14 is mounted in bearings disposed in the casing 12 at the opposite ends thereof. The bearing adjacent the fan 11, shown in section in Fig. 1 and designated by the reference numeral 18, is a sleeve bearing having an interior cylindrical bearing surface 19 engaging the adjacent or journal portion 21 of the shaft 14. The bearing 18 is of the self-aligning type, being formed with a spherical exterior surface 22. The casing 12 is provided with a cylindrical flange or socket 23 formed with a spherical surface 24 which constitutes a seat for the right-hand side of the bearing 18. A spring-retaining member 25 holds the bearing 18 against the spherical seat. The retaining member 25 comprises a sheet metal disc from which prongs 26 are struck. The prongs 26 extend in a generally axial direction toward the seat and bear against the spherical surface of the bearing, as shown in Fig. 1. The retaining member 25 is supported by a cylindrical flange or tubular member 27, which is formed integrally with the casing 12 and encompasses the bearing member 18 in spaced relation thereto, thereby forming a chamber 28.

An oil wick 29 is provided for lubricating the bearing 18, which is preferably of the porous or so-called "oilless" type; that is, it is made of a powdered material compressed into a solid body. Accordingly, the end of the wick 29 merely abuts against the bottom of the bearing 18 and the oil carried by the wisk flows to the bearing surface 19 by capillary action. To provide for positioning the upper end of the oil wick 29, a tubular wick guide member 31 is provided. The latter is inserted through an opening formed in the bottom of the cylindrical flange 27, and the portion of the tubular member in the opening is expanded to hold the tubular member firmly in place. As shown on the drawing, the tubular member extends upwardly to within a short distance of the bottom of the bearing, and at its lower end it is formed with a flared or bell mouth 32. It is also formed with openings 33 disposed at the bottom of the chamber 28. The cylindrical flange 27 is formed with a downwardly-extending flange 38 around the lower end of the opening through which the member 31 is inserted.

The oil wick 29 is retained in a tubular or cup-shaped closure member 34, a helical spring 35 being telescoped about the wick for maintaining the same in vertical position. The upper end of the closure member 34 telescopes the lower end of the tubular member 31, and preferably also the flange 38, so as to assure that any lubricant draining downwardly on either the interior or the exterior of the tubular member 31 is drained into the interior of the closure member 34.

The tubular member 31 provides a lateral support for the upper end of the wick which extends through the chamber 28, thereby assuring that the upper end of the wick will contact the bearing 18 to supply lubricant thereto. The tubular member 31 also serves as a guide for assembling the wick, the bell mouth or end facilitating the insertion of the wick.

The tubular member also provides for return of lubricant to the wick, by reason of the openings 33.

Another feature of my invention deals with a class of field trouble referred to as "oil throwing." In such cases, oil seeps out to the blade hub and is then thrown by the blades off onto the wall or adjacent objects. Difficulty has been encountered in providing suitable expedients to overcome this difficulty.

In accordance with my invention, I provide a helical or inclined oil return groove in the shaft in combination with an axial, or other non-circular, slot in the bearing. Referring to Fig. 1, the shaft 14 is provided with a groove 36. This groove is formed in that part of the shaft 14 adjacent the outer end of the bearing. It extends through a part of the journal portion along the bearing surface 19 and it also projects slightly beyond the end of the bearing. The groove 36 is inclined or wound helically in that direction in which it causes oil to flow inwardly of the bearing. In the illustrated embodiment, the motor 10 rotates the fan 11 in counterclockwise direction, as seen from the right in Fig. 1. Accordingly, the groove is inclined in the same direction as a right-hand thread. The bearing 18 is formed at its right-hand end with a slot 37. The slot extends through the bottom of the bearing surface 19, preferably in an axial direction, and also extends downwardly from the cylindrical surface. The groove 36 acts in the nature of an oil return groove, moving the oil inwardly of the bearing. Apparently, the slot 37 is effective to remove the oil from the groove 36 and to allow it to drain to the bottom of the chamber 28.

The hub 16 should be spaced a sufficient distance from the bearing 18 to minimize danger of creepage of lubricant along the shaft. In the embodiment illustrated on the drawing, in which oil throwing has been effectively eliminated, the shaft has a diameter of .36 inch, and rotates at three speeds, the lowest being 900 R. P. M. and the highest 1400 R. P. M. The distance between the bearing and the hub, known as the creepage distance, is $\frac{5}{16}$ inch. The greater the creepage distance and the higher the speed, the less is the danger of creepage.

I have found that this combination of oil return groove and slot, as shown and described, together with adequate creepage distance between the bearing and the hub, is highly effective to prevent oil throwing.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a bearing construction, the combination of a bearing member, a member for supporting the bearing and having a chamber in which the bearing member is disposed, said supporting member having an opening communicating with said chamber at the bottom thereof, a tubular member extending from said opening above the bottom of said chamber to a point adjacent said bearing member, a wick extending through said opening and said tubular member to said bearing to supply lubricant thereto, said tubular member having openings at the bottom of said chamber communicating between said chamber and the interior of said tubular member for draining lubricant from said chamber to the interior of the tubular member, and a tubular closure member enclosing the projecting end of said wick, said tubular closure member being attached to said supporting member with its upper end encompassing the lower end of said first-mentioned tubular member, said opening in the supporting member being smaller than and spaced horizontally inwardly from the top of said closure member, whereby said lubricant is drained into said tubular closure member and leakage to the exterior is avoided.

2. In a bearing construction, the combination of a supporting member forming a bearing chamber, a bearing of absorbent or porous material disposed in said housing with the bottom of the bearing disposed in spaced relation to the bottom of the chamber, a wick for lubricating said bearing, said supporting member having an opening formed therein communicating with said chamber at the bottom thereof, a tubular guide member extending through said opening above the bottom of said chamber nearly to said bearing and having an enlarged mouth at its lower end, said guide member having openings communicating between said chamber and the interior of said guide member for collecting oil from said chamber to the interior of the guide member, an oil wick whose upper end is adapted to be inserted through the enlarged mouth of said guide and to contact said bearing member to supply lubricant thereto, and a cupped member for holding said wick, said cupped member being screw-threaded to said supporting member with its upper end telescoping said enlarged lower end of said guide, whereby oil draining through said opening is caught by said cupped member and leakage to the exterior is avoided.

3. In a bearing construction, the combination of a bearing member, a member for supporting the bearing and having a chamber in which the bearing member is disposed, said supporting member having an opening communicating with said chamber at the bottom thereof, and a downwardly-extending flange surrounding the lower end of said opening, a tubular member extending from said opening to a point adjacent said bearing member, a wick extending through said opening and said tubular member to said bearing to supply lubricant thereto, said tubular member having openings communicating with said chamber for draining excess lubricant from the chamber back to the wick, and a tubular closure member enclosing the projecting end of said wick, said tubular closure member being attached to said supporting member with its upper end encompassing said flange, whereby lubricant is drained into said tubular closure member and leakage to the exterior is avoided.

GUSTAV H. KOCH.